Feb. 19, 1929.
F. I. JADEN
1,702,970
TIRE PUMP CONNECTING DEVICE
Filed Oct. 22, 1927
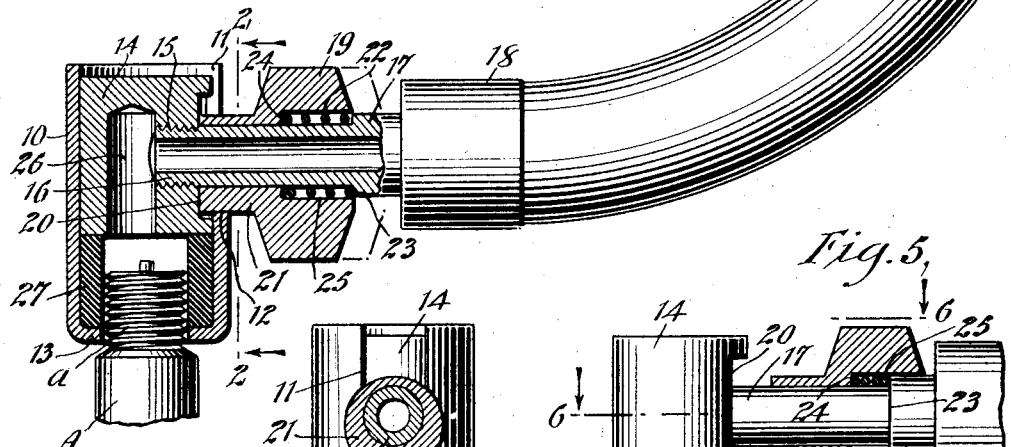
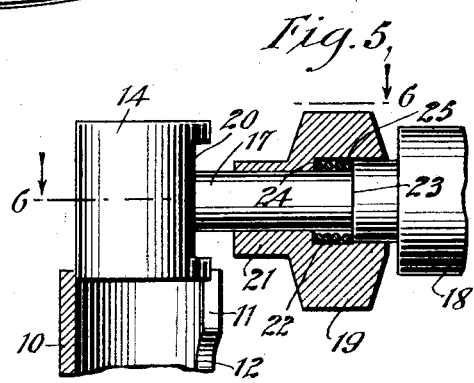
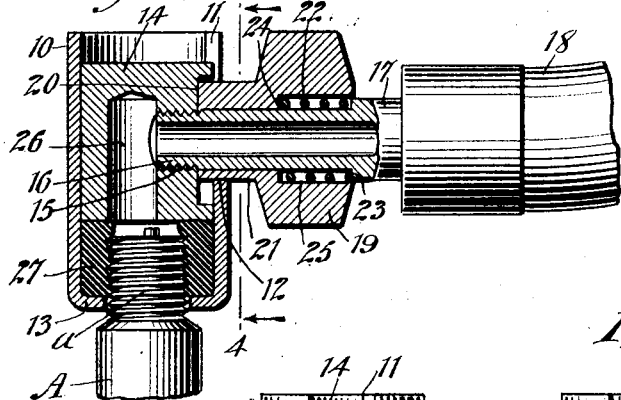
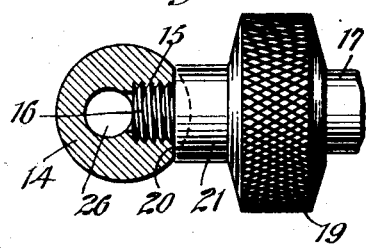
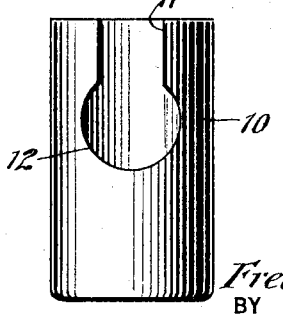
WITNESSES
Edw. Thorpe
INVENTOR
Fred I. Jaden
BY
Munn & Co.
ATTORNEY Patented Feb. 19, 1929.

1,702,970

UNITED STATES PATENT OFFICE.

FRED I. JADEN, OF HASTINGS, NEBRASKA.

TIRE-PUMP-CONNECTING DEVICE.

Application filed October 22, 1927. Serial No. 227,923.

My invention relates to means for establishing connection between the hose leading from a tire pump and a tire valve for use in inflating tires.

The general object of the invention is to provide a new and improved connection means for the stated purpose whereby the connection with the tire valve may be established in the minimum time and with maximum facility while at the same time effecting a firm and efficient connection.

The nature of my invention and its distinguishing features and advantages will be more clearly understood as the description proceeds.

Reference is to be had to the accompanying drawings forming a part of this specification, it being understood that the drawings are merely illustrative of one example of the invention.

Figure 1 is a view partly in longitudinal section and partly in elevation showing my improved connecting device applied to a hose and to a tire valve, both shown in part, the connecting device being shown in the form before securing it to the tire valve;

Figure 2 is a transverse section on the line 2—2 of Figure 1;

Figure 3 is a view similar to Figure 1 but showing the connecting device adjusted into gripping relation with the tire valve;

Figure 4 is a vertical section on line 4—4 of Figure 3;

Figure 5 is a longitudinal sectional view of a portion of the hose and its nozzle, the view being given to illustrate the manner of disassembling the connecting device, as, for example, when the rubber valve-gripping bushing is to be renewed or replaced;

Figure 6 is a section on the line 6—6 of Figure 5; and

Figure 7 is an elevation of the shell or casing of the connecting device, the view being given to show the form of slot in said shell.

In carrying out my invention in practice in accordance with the illustrations, a shell or casing 10 is provided having a slot 11 formed with an enlarged end 12, the preferred form of slot being that of a key-hole slot. The forward end of the shell 10 is formed with a flange 13 directed radially inward to present a restricted opening for the entrance of the threaded nipple $a$ of a tire valve A.

A cylindrical plug or body portion 14 is provided in the shell 10 and has on the side thereof a threaded hole 15 so that the threaded end 16 of a nozzle 17 of an air hose 18 can be tapped into said plug 14. A sleeve 19 is provided on the nozzle 17 and formed with a milled surface for the turning of same. The front terminal or nipple 21 of sleeve 19 is adapted to bind against the flattened side 20 of the plug 14 after said terminal 21 has passed transversely through the slot 11 of shell 10. A spring 22 is provided on nozzle 17 within the sleeve 19, said spring bearing at one end against the shoulder 24 of the counterbore 25 of said sleeve and bearing at its opposite end against shoulder 23 on nozzle 17. The numeral 26 indicates a longitudinal air passage in plug 14 communicating with the nozzle 17 when the threaded end 16 of said nozzle is engaged with thread 15 of plug 14.

The threaded end or nipple $a$ of tire valve A is adapted to be firmly gripped by a resilient bushing 27 in the shell 10 in front of the plug 14.

It will be observed that the terminal or reduced end 21 of the sleeve 19 has an eccentric bore through which the stem 17 passes, so that said terminal 21 constitutes a cam. Said cam 21 lies in the slot 11 and is adapted to bear against the shell 10 at the enlarged end 12 of said slot, as indicated in Figures 1 and 3. The arrangement is such that the sleeve 19 may be turned in the enlarged end 12 in a manner to cause the shell 10 to move in such a direction as will bring the flange 13 a less distance from the adjacent end of the plug 14, whereby the resilient bushing 27 will be compressed and the bore thereof constricted so as to bind on the threaded nipple $a$ of valve A, whereby to firmly bind the device on the said valve nipple. Or, the cam 21 may be turned in a manner to move shell 10 in a direction to cause the flange 13 to relieve the pressure on bushing 27 thereby releasing valve nipple $a$. When it is desired to dismember the connecting device consisting of the shell 10, plug 14, and resilient bushing 27, it is only necessary to slide the sleeve 19 rearwardly on the nozzle 17 of the air hose 18. This rearward sliding of the sleeve 19 compresses spring 22 and withdraws the terminal 21 from contact with the flattened side 20 and out of slot 11, whereby the nozzle 17 with sleeve 19 thereon may be moved lengthwise of the slot 11 toward the outward end thereof and carry with it the plug 14, all as will readily be understood from an examination of Figure 5. With the plug removed bushing 27 may be renewed.

It will be readily understood that with the device constructed and functioning as described, a fastening of the connecting device to the tire valve can be effected very quickly. Moreover it will be seen that the device is of exceedingly compact construction which enables it to be used on all makes of wheels, some of which wheels have very little clearance between the end of the valve stem and and the hub of the wheel, or between the side of the valve stem and other parts of the wheel. This advantage is because the diameter of the connecting device is very small and the over-all length of said device is minimized. Moreover it is to be observed that the sleeve 19 is between the shell of the connecting device and the air hose, so that it is not necessary to reach so far as the shell and body of the connecting device in order to lock or fasten it to a tire valve. The device does away with all levers for the turning of which there is in some wheels no clearance for the lever and the locking and binding of the connecting device to the tire valve. A further point of advantage of the above described connecting device is that the fastening of the said device to a tire valve does not always take place at precisely the same point. With most makes of connecting devices for the purpose the lever or other part which does the fastening to the tire valve must always be turned to the same identical point before the connection with the tire valve is fully established. With my improved construction the natural wear from use of the rubber bushing under an ordinary amount of wear, or a slight variation in the nipple or threaded terminal of the valve stem will not prevent the attachment of the connecting device in a manner to hold it securely to the valve under several hundred pounds air pressure.

It will be further realized that my improved connecting device requires no tools for dismembering the device or for changing the resilient bushing. It will be apparent furthermore that the described assemblage makes for compactness.

I would state furthermore that while the illustrated example constitutes a practical embodiment of my invention, I do not limit myself to the exact details herein illustrated, since, manifestly, the same can be considerably varied without departure from the spirit of the invention as defined in the appended claims.

I claim:

1. A device for connecting an air hose with a tire valve including an air nozzle, an element to which said air nozzle connects for the passage of air, and means subject to compression by said element and adapted to grip a tire valve, together with a sleeve on said air nozzle adapted to bind against said element and movable on the nozzle to release the binding action, and a compression spring within said sleeve normally tending to effect the binding of the sleeve against said element.

2. A device for connecting an air hose with a tire valve, including a shell, a plug, the plug longitudinally movable in said shell and having an air passage, an air nozzle, said plug having means to be detachably engaged with the nozzle for the inlet of air to said plug and its air passage, and a cam slidable and turnable on the air nozzle and engageable with said sleeve to move the sleeve forward or back by the turning of the cam, and a resilient bushing in said shell in front of the plug.

3. A device of the class described including a shell, a resilient bushing held in said shell, a plug in the shell, said shell and plug being relatively movable longitudinally to exert pressure on the bushing or to relieve said pressure, said plug having an air passage, a nozzle adapted to direct air from an air hose to said plug and its air passage, and a sleeve on said nozzle, said plug having a flattened side, said sleeve having a cam formation and being slidable on said nozzle to bind against the flattened side of the plug and turnable with the sleeve to engage the shell for moving same.

4. A device for connecting an air hose with a tire valve including a shell having a slot formed with an enlarged end and open at the opposite end at an end of the shell, a resilient bushing held in said shell and adapted to receive the end of a tire valve entered at one end of the shell, a plug in said shell, a nozzle connecting with said plug, said plug having an air passage to direct air from the nozzle toward the tire valve, and a manually operable cam adapted to be accommodated in said slot and engageable with said shell to move it forward or back, together with a spring pressed sleeve integral with said cam and slidable on the nozzle.

Signed at Hastings in the county of Adams and State of Nebraska this 18th day of October A. D. 1927.

FRED I. JADEN.